Dec. 15, 1964  H. T. STIRLING  3,161,707
PROCESS AND APPARATUS OF MAKING LARGE BALLS IN A DRUM PELLETIZER
Filed Nov. 2, 1960  2 Sheets-Sheet 1

INVENTOR.
HAROLD T. STIRLING
BY
Thomas J. P. O'Brien
his
ATTORNEY.

Dec. 15, 1964 H. T. STIRLING 3,161,707
PROCESS AND APPARATUS OF MAKING LARGE BALLS IN A DRUM PELLETIZER
Filed Nov. 2, 1960 2 Sheets-Sheet 2
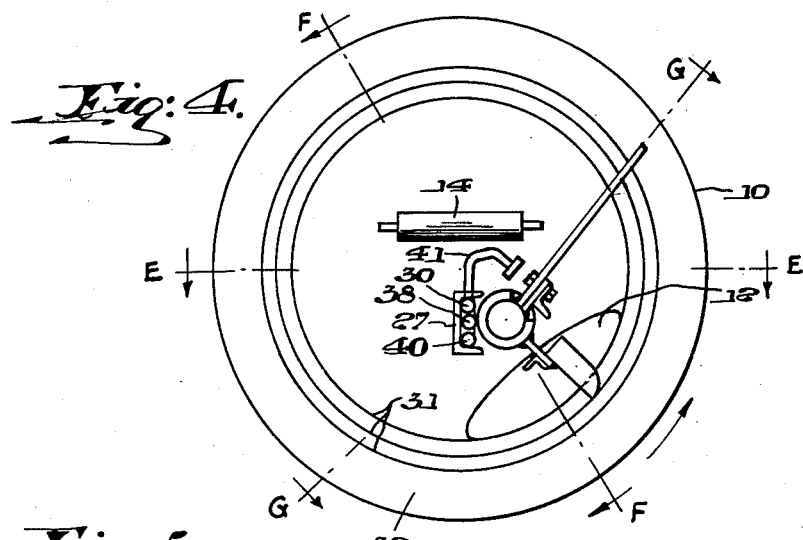
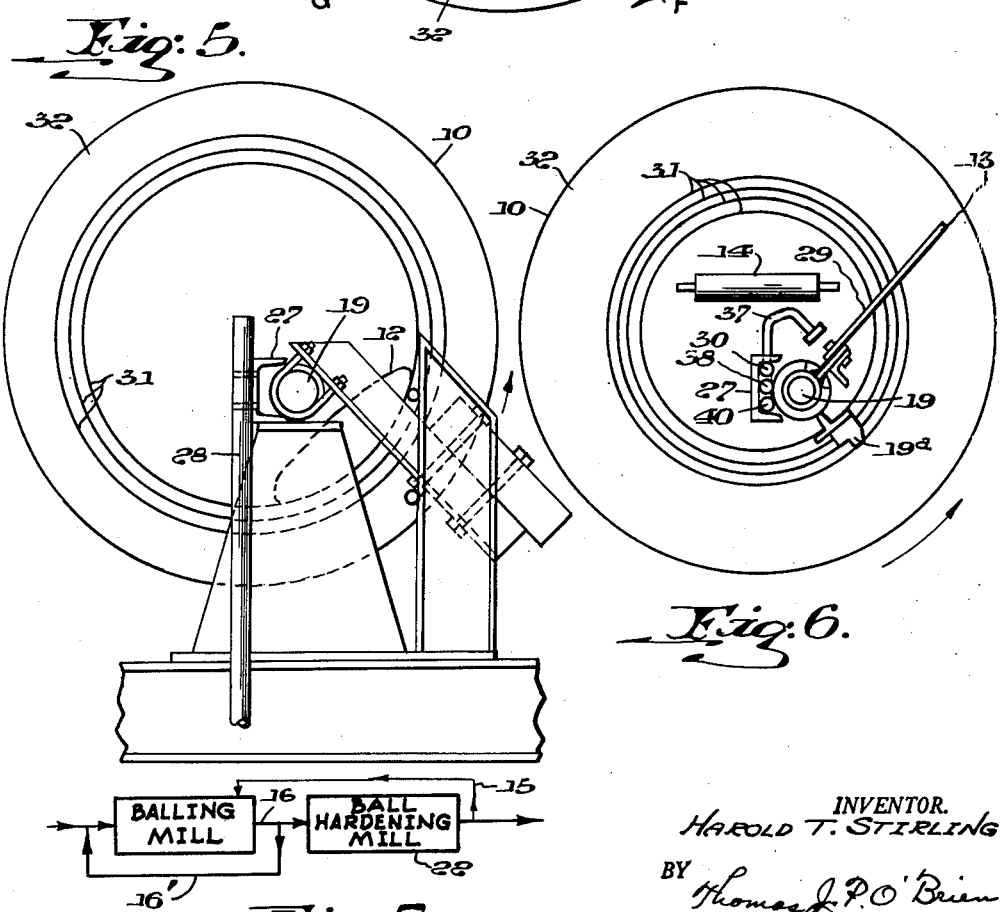
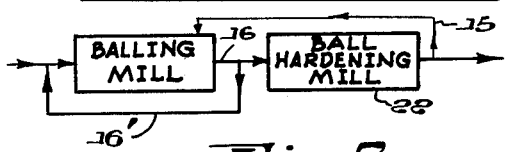
INVENTOR.
HAROLD T. STIRLING
BY Thomas J. P. O'Brien
his ATTORNEY.

3,161,707
PROCESS AND APPARATUS OF MAKING LARGE BALLS IN A DRUM PELLETIZER

Harold T. Stirling, Pittsburgh, Pa., assignor to Koppers Company, Inc., a corporation of Delaware
Filed Nov. 2, 1960, Ser. No. 66,781
5 Claims. (Cl. 264—117)

This invention relates in general to processes for agglomerating beneficiated low-grade iron ore into pellets or balls of high-impact strength, and particularly, with uniform sizes for heat hardening and use in blast furnaces and open-hearth charges. More specifically, the invention is directed to a high rate of production in the formation of compact pellets or balls of high-impact strength of more than one and one-half pounds in sizes ranging from ⅜ inch to 3 inches in diameter without requiring large recycling loads and several passes of the pellets to produce large enough pellets or balls as aforesaid in rotary drum systems of the type shown in my Patent No. 2,920,344, dated January 12, 1960, of which this application is a successive continuation-in-part through the common assignee's now copending application of Walter B. Thomas, Serial No. 855,180, filed November 24, 1959, now Patent No. 2,984,860.

The process of the invention is especially suitable to a higher capacity production in said rotary drum systems of compact agglomerates of either natural or beneficiated iron ores, such as magnetite produced from taconite concentrators of —200 mesh grind.

The process of the invention is, however, also of special utility in agglomerating into high-impact strength, for heat hardening and sintering, of concentrates of the specular hematite variety in iron ore. This type of material is, in general, all of —20 mesh Tyler scale in size, but contains relatively little of —200 mesh in size.

It has a mirror-like finish and it is extremely difficult to make such smooth surface particles stick together to form pellets or balls. It is highly crystalline hematite ($Fe_2O_3$) with little or no water of hydration. It is definitely too fine to heat, harden, or sinter directly, and until now, no practical or commercial balling or pelletizing method is capable of handling concentrate coarser than 200 mesh. Grinding of it to pelletizing size would be prohibitively expensive under the rule that grinding energy is proportional to new surfaces produced.

In producing balls or pellets in conventional manner in rotary drums a ball, as it is produced, continually grows in size by rolling on a smooth surface. The pressure created, due to the weight of the ball on the surface at the minute point of contact, becomes quite enormous. In the operation of the drum of the Stirling patent aforesaid, by increasing the speed and maintaining a depth at the same time in the balling drum, these balls cascade one over another and also roll in the most rapid manner that it is possible to roll in a drum of that type. This produces a maximum rolling rate and maximum cascading rate and an appreciable thickness of one ball on top of another along with jarring or impingement of one ball against another to create points of contact between balls while they are in process of continual rolling or cascading, to create pressures on surfaces of the balls many times greater than the pressure that would exist with a single ball resting or rolling on a smooth surface. The drum pelletizer runs at such a speed that it is just short of creating enough centrifugal force that the material would be carried on around the drum. Because of this procedure, the Koppers Stirling balling drum creates balls that are probably much more compressed but also are produced at about the maximum rate obtainable with the dimension of drum used in producing the balls. The inventor has found that by placing enough of the specular hematite material in the compartments of the Stirling balling drum practically to fill the compartments and rolling and cascading the material in these compartments for about two or three minutes at a time when it contained about 9% moisture, with the application of heat for two to three minutes, adjacent to the falling balls while they were still rolling and cascading in the drum so that this heat would be radiated to the wet balls to obtain a partial drying of the balls while they were in the process of being rolled, balls could be obtained with relative ease that varied in size between about ¼ inch and ⅜ inch diameter, and the partially dried balls, when given a conventional crushing test (placing a weight on the ball to determine when the ball will crush), showed a crushing strength between 3½ pounds and 5 pounds. Experts in the industry have concluded that a ball is satisfactory for handling when its crushing strength is greater than about 2½ pounds.

From this, it will be noted that the material, which the industry has considered to be next to impossible to pelletize into balls, can be made suitable for handling, and have been produced under actual conditions, which have been satisfactory for handling. The material is in suitable form for use in the conventional sintering process. The balls are on the small side for production of heat-hardened pellets, without recycling through the drum with several passes to produce large enough balls for heat-hardening or other metallurgical use.

In accordance with the present invention, to produce said balls in larger sizes without necessity for maintaining a large recirculating load of incompletely formed pellets or balls in the drum with several passes of them through the drum to cause them to grow in size, the material aforesaid are formed in the larger sizes by initially introducing the finely-divided material having particle sizes ranging from 20 mesh to —325 mesh into a generally horizontal rotating drum at a first localized non-watering region thereof and maintaining the material rolling in that region until the finely divided material is balled up to a predetermined size, and the balls are compacted and prepared for flow to a next region in the drum. The balls from the first region of the drum then flow over a dam into a next watering region in the drum and rolling them is continued therein while adding water thereto sufficient to wet the surface of the balls, for adherence of additional finely-divided material which will increase the size of the balls a further predetermined amount. The wetted balls from said next watering region then pass over a dam into a succeeding non-watering region, and additional finely-divided material is initially added in amount that all added material will be balled up onto the so-wetted balls to increase their size another predetermined amount while they are rolling in the succeeding non-watering region of the drum to compact them, whereupon the re-wetted balls from the succeeding non-watering region then flow over a dam. The wetting of the balls and the initial adding of finely-divided material is repeated in successive watering and non-watering regions as aforesaid along the drum while rolling the balls as aforesaid in said region, to further increase the size of the balls stepwise during their progressive flow through the drum.

The re-wetting of material and the initially applying of fine material thereto at alternate intervals along a balling drum, will increase the size of the pellets or balls formed in a single mass, in a manner to reduce the recycling of fines to form larger size pellets. Nevertheless, a large number of balls of a size below that desired, will still flow unimpeded through the drum. Further additional fines will be created at each initial solid feed point, and a large percentage of these fines would escape without attaching themselves to the larger balls formed in the drum, requiring a still large recirculating load and larger equipment for the finished throughput of the fines in the form of balls or pellets. With the application of such re-wetting and initial applying of fine material at alternate areas along a drum in conjunction with segmental compartments therein as in my aforesaid patent, boundaries are formed between the successive solid-free and water-adding zones. Consequently, the majority of balls in each compartment reach the desired size in the respective compartments before leaving them to enter a next compartment. The fines added at several points along the drum become attached to other balls in each dam section before they pass along to enter a next compartment. There is thereby attained a greater capacity of finished pellets or balls with a reduction in the recycle load to form said articles.

Other objects and advantages of the invention will be apparent as it is better understood from the following description when taken in connection with the accompanying drawings illustrating the best mode of the present invention:

FIGURE 4 is a vertical cross-sectional view taken on the line C—C of FIGURE 1;

FIGURE 5 is a similar view taken on the line D—D of FIGURE 1;

FIGURE 6 is a similar view taken on the line B—B of FIGURE 1;

FIGURE 7 is a flow diagram showing the relation of the balling system with the heat-hardening system.

The same reference numerals are used for like parts in each of the several views.

Figure 1:
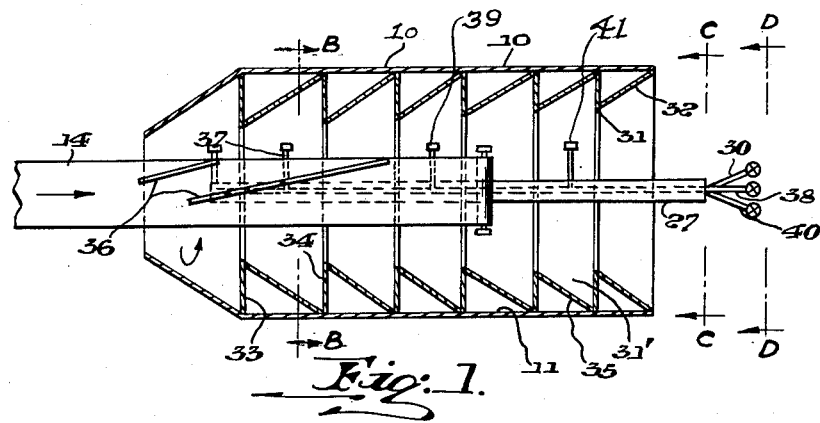
FIGURE 1 is a horizontal sectional view taken on the line E—E of FIGURE 4.
Figure 2:
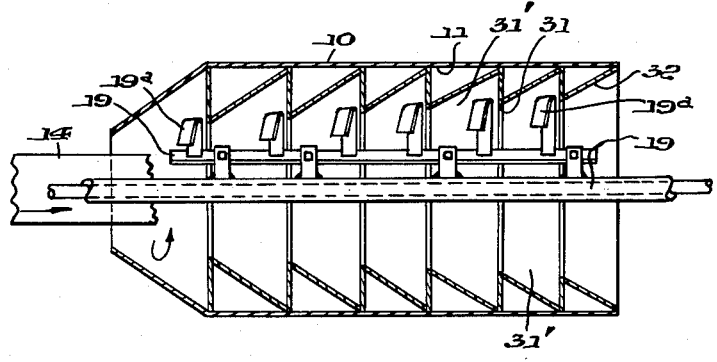
FIGURE 2 is a similar view taken on the line F—F of FIGURE 4.
Figure 3:
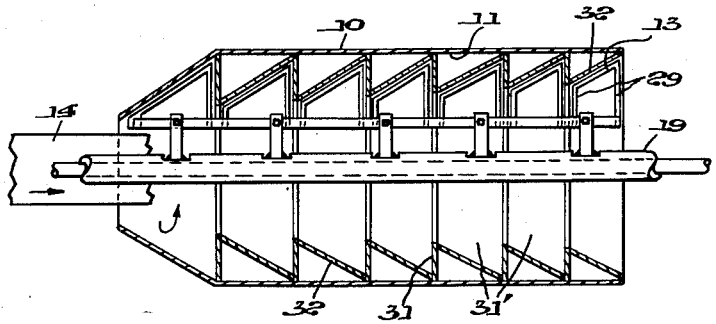
FIGURE 3 is a similar view taken on the line G—G of FIGURE 4.

Referring to the drawings, the improved method is carried out in the improved balling system as shown, which is of the type of the aforesaid Stirling Patent No. 2,720,344, but with the scraper system therefor of the aforesaid Thomas application, Serial No. 855,180, which was filed November 24, 1959, now Patent No. 2,984,860, and hence, was copending with the Stirling patent application, which was filed September 10, 1958, and issued to patent on January 12, 1960.

The improved balling drum 10 consists of a cylindrical, smooth, inner side shell 11, scrapers 13, a feeder 14, an end casing (not shown) with a bottom discharge outlet, lifting scoop supports 19, lifting scoops 19A, and a motor drive (not shown) for rotating the drum 10.

Wet recycle fines and sticky mix are fed to the feeder 14 shown as an endless belt conveyor and the finished nodulized product conveyed from the outlet end 16 to the feeder pans or other layering means for a continuous endless strand sintering machine or heat-hardening mill 22.

The drum rotates on idler rolls (not shown) and the support 19 for scoops 19A are mounted on a supporting truss 27 supported at each end by beams 28. The scrapers 13 are carried by secondary supporting arms 29 carried by support 19 that is supported on the trust 27 as a common support. The arms 29 are interconnected with the support 19 by shims and slots to adjust the position of the scrapers 13. The scoop bars 19 have the scoops 19A thereon in the form of slightly deflected blades or knives at the ends of the bars which tend to shunt the layer materials over into the next baffle or dam section 31. The position of the scoops is adjustable so that the desired shunting action can be obtained to meet the requirements of a particular operating rate. The scoops 19A and the scrapers 13, when adjusted to the baffles or dams 31 and deflectors 32, are then operated in a fixed position relative to the rotating drum 10.

The general aim of the drum is to simulate the action of a conventional disc pelletizer at successive intervals along the drum from the inlet to the outlet. This is attained by having the baffles or dams 31 set annularly in transverse planes that are in general wholly in a plane at right angles to the longitudinal axis of rotation of the drum or slightly inclined down stream, rather than at an acute angle, such as a spiral or serpentine baffle as in a customary balling drum or pugging drum.

The employment of baffles or dams 31 at right angles, or slightly inclined, relative to the general line of the axis of rotation of the drum 10, with the baffles or dams 31 disposed annularly at spaced intervals along the inner surafce 11 of the drum, results in the baffles 31 in the drums retarding the flow of material and inducing sufficient tumbling action as in the disc pelletizer, that is, to ball the material to the desired predetermined condition most suitable for heat hardening or sintering on a movable grate, while at the same time attaining the characteristic higher throughput or capacity of the ordinary balling drum or pugging drum without baffles, or with baffles in a spiral plane which tend to favor the flow of fines through the drum.

Thus, the material is made to flow through a number of, for instance six, psuedo disc pelletizer sections 31′ as it passes through the drum. Observation of the material during actual operation of the drum tends to show that the action is like that of a disc pelletizer, that is, as the material enters a baffle or dam section or region 31′, the larger, heavier balls rapidly roll down the inclined drum surface or an inclened deflector plate 32, when employed between each two baffles or dams 31, to be discharged into the next section or region 31′ while the fines continue to move much more slowly down the inclined surface 32 and sometimes even appear to move back up such inclined surface 32.

With this above-described Stirling drum system, it is possible to achieve, in an inclined drom without recycling of fines, the same satisfactory balling action for sintering or heat-hardening machines, with one type of sinterable or heat-hardenable material, but not with various other types of sinterable or heat-hardenable material, as is obtained with a series of conventional disc pelletizers, but with the same higher capacity or throughput with recycling of fines, as in the conventional balling drums and pugging drums, with a retention time of 60 to 90 seconds.

Minimizing excessive production of fines to avoid the difficulties and disadvantages of recycling the fines is achieved in part by means of the deflector 32 between the downstream sides 33 of the baffle or dam 31 and a lower region of the upstream side 34 of each next baffle or dam 31, as shown on the drawing, with the elevation of the deflectors 32 sloped less than 2″ per linear foot towards the discharge end of the drum.

The angle of inclination 35 at which the deflectors 32 are set in relation to the drum inner circumference 11 is between 25° and 50°.

The combination of such cheese cutter type scraper parts of the Thomas system with right angle baffles or dams and downstream deflectors pitched at 25° to 50°, has been found by the present inventor to be the best mode of construction, not only because balling is satisfactory with both coarse and fine materials, as well as the aforesaid successively wet material or a sticky mix, but also because it is possible to produce a satisfactory product while operating in the horizontal position, which is more advantageous than operation in the inclined position at an angle to the vertical, since the latter involves special engineering and construction to accommodate the thrust on thrust bearings at the lower end of the drum to minimize maintenance and upkeep costs on the driving mechanism.

With the drum rotating counterclockwise as viewed in FIGURES 4 and 6, looking from the direction of the feed end, the scrapers 13 are mounted to scrape in the position between three o'clock and twelve o'clock (i.e., 90° and 1°, preferably between two o'clock and one o'clock).

The scrapers 13 are mounted for scraping in a direction opposite to the direction of rotation of the drum, to insure fall of only small, rather than very large lumps or particles into the pelletizing area 12 of the drum.

Hot returns from the sintering machine or ball heat-hardening step 22, may be intermixed with the balls in the latter stages of balling to dry the same, as indicated by line 15.

Fines from screening of the output of the balling drum are recycled, as indicated by line 16', to the inlet end of the balling drums or to the material on the feeder 14.

In processing the material in this manner, the iron ore, either natural or beneficated, or other materials added to the front end of the balling drum or pelletizer, grows onto seeded pellets or recycled fines or balls in a natural manner in the first cone or dam section of the balling drum. The fine material becomes consumed in making pellets of indefinite size in the first section. These balls or pellets then move onto the second section where the water is added in sufficient quantity to wet the surface of the previously formed balls or pellets. This material then flows into a third section or compartment where new material is again added by belt or other conveyor means in sufficient quantitiy to cause this material to contact the previously formed and wetted balls to enlarge their size still further. This stepwise procedure of adding material, wetting while being rolled, takes place in any desired number of compartments or sections within the balling drum.

At times, it becomes advantageous when carrying out the balling technique described in the foregoing, to add a very finely-divided clay-like material, such as bentonite, to assist in binding the particles that go to make up the balls. Many times an electrolyte is also added, such as sodium chloride. Fine coke breeze may be, and is, added in the last or later sections of the drum for attachment to the pellets or balls while they are rolling, for use in heat-hardening the pellets.

The inventor has found that if the original material to be balled is too wet, or has too high a moisture content as it enters the drum, then too large amount of new seeds form almost immediately in the first compartment of the balling drum and the degree of size to which a ball can grow in passing from compartment to compartment in the balling drum, is somewhat limited, or a much greater amount of time and recycling of material is required before the ball reaches the size desired. Reference here is had to balls that will be sized anywhere from ⅜″ diameter to between about 2″ and 3″ diameter, depending on the end use to which the ball will be put.

Accordingly, the invention comprises giving the material to be balled a treatment to adjust its moisture content, if it is not already in this condition, so that its moisture content is below that required to produce balls. This is usually below a moisture content of 7%. If this material is added to the first section of a balling drum and the water is then added to the material as it is rolling in this section, then a fewer number of balls are produced per unit of time and per unit of weight of material being balled. As these fewer number of balls per unit of weight now flow from the first compartment into the second compartment while the drum is rotating, additional water from line 30 is added in the second compartment by branch 37 to wet the surface of the balls and control the moisture content of the total ball between about 8% and 15%. This rolling and wetting procedure compacts the ball still further and prepares it for discharge as it is rolling into the next or third compartment or section of the balling drum. Here again, fresh iron ore or concentrate or other material to be balled, having a moisture content lower than that required to make balls, is added by plow 36 to the rolling balls, in quantities substantially equal to that required to cause all of the new material to adhere to the wetted balls and end in that compartment with a ball having a moisture content between 8% and 15%. Again, this material flows to a succeding compartment where the surfaces of the balls are wetted again by water from line 38 through branch 39 while they are being rolled, to repeat the process of wetting, as by water from line 40 through branch 41, rolling, adding new material to the old balls, etc. It will be observed from this that the material that is added by plows 36 for balling, has a moisture content below that required to make good balls, but it is added to the various sections within the drum onto balls that have a moisture content suitable for forming balls or having a moisture content after the material has contacted and rolled with the balls, forms a ball that has the characteristic balling tendencies. This attains a stepwise enlargement of the balls as they proceed through the balling drum. In some cases, it is possible for the balls to reach the desired size, starting with the material that is lower than 20 mesh in size by making only one trip through the drum. However, ordinarily, there will be some balls arriving at the discharge end that are smaller than the size desired.

The balls of the desired maximum size to which a binder may or may not have been added, to create a crushing strength of more than 1½ pounds and which may be anywhere from ⅜″ to between 2″ and 3″ in diameter, discharge from the last region or compartment in the drum through a screen arrangement that may either be a part of the rotating drum or it may be a vibrating screen immediately after the drum. This screening arrangement will permit the undersize balls to fall onto a belt which will return them to the first compartment of the drum. Water may be added to these balls before they enter the first compartment of the drum, in which case, fresh material having a moisture content below that required to make balls, may be added to this returned material in the first section of the balling drum to adhere to the previously formed balls of undersize and cause them to increase in size, beginning with the first compartment of the balling drum. An alternative is to add the recycled balls without further addition of water to them until they are added into the first compartment or section of the balling drum. Water is then sprayed on the balls as they rotate in the first compartment of the rotating drum. These wetted balls overflow into the second compartment and fresh material is then added to the second compartment to adhere to these wetted, rolled balls at a rate about equivalent to the discharge of desired size balls from the balling drum. The process of moving new material and recycled material through the drum in step manner is then carried out as described previously. Any number of compartments may be used in the drum to carry out this stepwise type balling technique.

The balls of desired size that are discharging beyond the screen arrangement at the discharge end of the drum, which are approximately equal to the rate of feed of new material to the front end of the drum, are then sent either to a rolling, drying step, a stationary drying step, a combined roll drying and heat-hardening step, or a combined stationary drying and heat-hardening step, or a combination of these, depending on their usage thereafter. If the balls are to be sintered, they will be of the smaller size, while if they are to be heat-hardened, they will be at least ⅜″ diameter. If they are to be used for open-hearth or oxygen steelmaking purposes, they may be 2″ or 3″ in diameter.

In carrying out the technique described in the foregoing with the Koppers drum, as taught in the aforesaid Stirling patent which issued in January, 1960, it has been discovered that the drum must be tilted to slope less than 2″ per linear foot towards the discharge end, and preferably, anywhere between a horizontal position to a slope of 1″ per foot in the direction of the discharge end. It is also possible to maintain the drum substantially horizontal and to likewise decrease the elevation of each compartment or deflector plate or inclined surface 32 in the drum less than 2" per linear foot towards the discharge end, and preferably, the equivalent of up to 1" per foot toward the discharge end.

When large balls are formed, such as those having a diameter of about 2" or greater, and when the dam at the downstream side of a particular compartment or region of the drum is vertical, then the larger balls as they are rolling, tend to form a layer at an elevation below the weir or dam of that particular region. Smaller balls than the largest tend to roll down over the top of the larger balls, which in turn causes smaller balls to move toward the discharge end of the drum, with the larger balls having difficulty reaching the elevation of the top of the weir or dam of that particular region. This is overcome by tilting the drum as aforesaid, and preferably, up to an equivalent of about 1" per foot of length of drum. In such case, the larger balls tend to ride up the slightly inclined surface of the dam which is downstream in that particular region or compartment.

The inventor has found that for ores and concentrates, such as specular hematite concentrates having particle size ranges predominantly below 20 mesh, and in some cases, practically 100% smaller than 325 mesh, that the amount of time required to produce balls of the desired size can be less than about five minutes.

It is to be particularly noted that the best balling action in the balling drum, takes place when the moisture content of the feed material, either in its natural state or dried after processing to produce the concentrate, is below 7% or less than the water content required to produce balls, and with the moisture content during the balling operation varying from compartment to compartment within the limits of 8% and 15%. It should be borne in mind that the texture or the particle size of some concentrates or ores requires slightly different moisture content to produce balls than do other materials. However, the balling action for practically all materials which have been worked with, usually require moisture contents between 8% and 15%, with one exception, and this was for finely-divided coal which required a moisture content of between 20% and 25%.

It will be obvious to those who become familiar with the art of pelletizing ores, concentrates or other materials, that the use of a series of deflectors 32 like that disclosed in the Stirling patent issued in January, 1960, can be departed from, and still obtain, good balling action without attaining the advantages of said system. In other words, the angle of the deflector in the Stirling drum, or a slight change in the angle of the dam 31 downstream from that particular region, may be made, and still obtain a moderately fast balling rate. For example, with the drum horizontal, instead of having the dam 31 downstream from each particular region perpendicular to the shell, the dam could slope a few degrees off perpendicular and still get the same type of action here discovered by the inventor in making big balls. For example, the teaching in the foregoing aspects of the present invention apply to a drum having compartments or regions that are like the drum described in my aforesaid Stirling patent and also apply to a drum that is made up of regions or compartments consisting of rings perpendicular to the shell of the drum, as well as regions or compartments that form a V arrangement at the bottom of each region or compartment, or a V that has its bottoms partially cut off. While such a drum might not produce balls quite so rapidly as the Koppers type drum of my aforesaid patent, nevertheless, it produces at a satisfactory rate when applying my new findings of always adding material having a moisture content below the average moisture content maintained during the balling procedure and then maintaining conditions within the drum, whereby the moisture content of previously formed balls is such that it will promote the growing in size of the previously formed balls using the fresh material which, before it contacted these balls in the various regions or compartments in the drum, was deliberately placed in condition not to form balls.

It is believed that I am the first to become aware of the significance of having a large number of individual regions or compartments within the drum and to have balls flowing into and over these various deflectors or compartments in such a manner that they become wetted sufficiently so that they will be conducive to the growing in size due to contact, while rolling, with new material that was previously placed in condition to permit itself to be absorbed onto the surface of wetted balls and then to pass from this stage of attaching onto previously formed balls to another stage where the moisture content is again increased to a point where more new material could be added into a subsequent compartment which when it contacts the rolling ball would be in condition to attach itself to the ball to consume the adsorbing properties of the balls. The foregoing, of course, takes place in a manner that any balls which finally leave the drum and which are too small in size, are returned without substantial changes in their quality from the standpoint of balling properties (moisture content) to the first region or compartment of the balling drum where they are either already in condition to receive new material that will be capable of adding itself onto the ball to enlarge its size or where, in the first compartment it is wetted further and rolled to be placed in condition so that material which has been adjusted in a manner not to have balling properties when it is rolled by itself, can then be added to the ball to cause the ball to grow.

The size of balls or pellets discharging from the discharge end of the drum pelletizer will be regulated either by (1) the number of disc or drum regions or sections in the drum pelletizer; (2) the quantity of water and/or new material added to each section, or (3) the rate of throughout of material through the drum pelletizer along with the regulation of the water to each section in the pelletizer.

The adjustment of the water content of the incoming feed material may be effected by the heat of the hot return material from the heat-hardening or sintering step, as by mixture of said hot returns with the incoming feed before or after it initially enters the drum, with or without admixture with recycle fines from the balling drum.

The invention as hereinabove set forth is embodied in a particular form and manner, but may be variously embodied within the scope of the claims hereinafter made.

What is claimed is:

1. A method for making ball-like particles from finely divided iron ore such as specular hematite concentrates having particle sizes in the range from about 20–325 mesh, using a rotatable drum having a plurality of adjacent internal zones, comprising the steps of:
   (a) rotaing said drum;
   (b) introducing a first quantity of said material into a first internal zone as said drum rotates, said material forming ball-like particles in said first zone;
   (c) flowing the ball-like particles into a second zone as said drum rotates;
   (d) wetting the surface of the respective ball-like particles in said second zone as said drum rotates;
   (e) flowing said wetter ball-like particles into a third zone as said drum rotates;
   (f) introducing another quantity of said finely divided material into said third zone as said drum rotates so that the latter material adheres to the wetted surface of the respective ball-like particles whereby each ball-like particle increases in size;
   (g) flowing the enlarged ball-like particles into a fourth zone as said drum rotates; and
   (h) repeating the foregoing sequence of steps until said ball-like particles achieve a desired size.

2. The method as set forth in claim 1 wherein:
   (a) the first quantity of finely divided material as it is introduced into the first zone as said drum rotates, has a maximum moisture content of 7 percent by weight; and (b) sufficient water is added in the succeeding water zones as said drum rotates to raise the moisture content of the balled material to a value within the range of 8-15 percent by weight.

3. The method as set forth in claim 1 including the step of adding (a) sufficient moisture in the first zone as said drum rotates to raise the moisture content of the finely divided material to a value such that the finely divided material forms ball-like particles.

4. Apparatus for making ball-like particles from finely divided iron ore such as specular hematite concentrates having a particle size in the range from about 20-325 mesh, using a rotatable drum wherein there are a plurality of adjacent internal zones, comprising:

(a) means for rotating said drum;

(b) means for introducing a first quantity of said material into a first internal zone as said drum rotates, said material forming ball-like particles in said first zone;

(c) means for flowing the ball-like particles into a second zone as said drum rotates;

(d) means for wetting the surface of the respective ball-like particles in said second zone as said drum rotates;

(e) means for flowing said wetted ball-like particles into a third zone as said drum rotates;

(f) means for introducing another quantity of said finely divided material into said third zone as said drum rotates so that the latter material adheres to the wetted surface of the respective ball-like particles whereby each ball-like particle increases in size; and (g) means for flowing the enlarged particles into a fourth zone as said drum rotates.

5. The invention as set forth in claim 4 including:

(a) means for screening the ball-like particles emerging from said rotating drum and separating the particles with respect to size; and (b) means for recycling the undersized ball-like particles into the first zone of said rotating drum.

References Cited by the Examiner

UNITED STATES PATENTS

| | | | |
|---|---|---|---|
| 2,304,382 | 12/42 | Shoeld | 18—1 |
| 2,436,771 | 2/48 | Hood | 73—3 |
| 2,543,898 | 3/51 | DeVaney | 75—3 |
| 2,550,802 | 5/1 | Gholson. | |
| 2,709,833 | 6/55 | Wiklund | 18—1 |
| 2,786,232 | 3/57 | Larson et al. | |
| 2,860,589 | 11/58 | Loesche. | |
| 2,876,489 | 3/59 | McDowell et al. | 18—1 |
| 2,920,344 | 1/60 | Stirling | 18—1 |
| 2,948,918 | 8/60 | Austin | 264—11 XR |

ALEXANDER H. BRODMERKEL, *Primary Examiner.*

RAY K. WINDHAM, WILLIAM J. STEPHENSON, *Examiners.*